(12) United States Patent
Kang et al.

(10) Patent No.: US 8,535,023 B2
(45) Date of Patent: Sep. 17, 2013

(54) LINEAR COMPRESSOR

(75) Inventors: Kye-Lyong Kang, Gyeongsangnam-do (KR); Jong-Kwon Kim, Changwon-shi (KR); Shin-Hyun Park, Pusan (KR); Hyun Kim, Changwon-shi (KR); Hee-Dong Kang, Changwon-shi (KR); Jeong-Uk Lee, Jeonju-shi (KR); Yang-Hoon Jung, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 12/993,237

(22) PCT Filed: Aug. 4, 2009

(86) PCT No.: PCT/KR2009/004347
§ 371 (c)(1),
(2), (4) Date: Nov. 17, 2010

(87) PCT Pub. No.: WO2010/016712
PCT Pub. Date: Feb. 11, 2010

(65) Prior Publication Data
US 2011/0097224 A1 Apr. 28, 2011

(30) Foreign Application Priority Data
Aug. 6, 2008 (KR) .................... 10-2008-0077168

(51) Int. Cl.
*F04B 35/04* (2006.01)
*F04B 17/04* (2006.01)
(52) U.S. Cl.
USPC ............ 417/417; 417/44.1; 417/45; 318/138; 310/15

(58) Field of Classification Search
USPC ............... 417/417, 44.1–44.11; 310/16, 135, 310/12, 15, 12.16, 17, 20, 21, 28–30
See application file for complete search history.

(56) References Cited

U.S. PATENT DOCUMENTS

| | | | |
|---|---|---|---|
| 3,788,778 A | 1/1974 | Miller | |
| 5,495,131 A * | 2/1996 | Goldie et al. | 310/12.15 |
| 6,379,125 B1 * | 4/2002 | Tojo et al. | 417/417 |
| 6,685,438 B2 * | 2/2004 | Yoo et al. | 417/44.11 |
| 6,952,060 B2 * | 10/2005 | Goldner et al. | 310/12.13 |
| 6,960,893 B2 * | 11/2005 | Yoshida et al. | 318/127 |
| 6,966,761 B1 * | 11/2005 | Roke et al. | 417/417 |
| 7,151,348 B1 * | 12/2006 | Ueda et al. | 318/114 |

(Continued)

FOREIGN PATENT DOCUMENTS

| | | |
|---|---|---|
| JP | 2004-072854 | 3/2004 |
| KR | 10-2006-0020008 A | 6/2006 |

(Continued)

*Primary Examiner* — Charles Freay
*Assistant Examiner* — Ryan Gatzemeyer
(74) *Attorney, Agent, or Firm* — McKenna Long & Aldridge LLP

(57) ABSTRACT

A linear compressor includes a fixed member provided with a compression space, a movable member which linearly reciprocates inside the fixed member to compress refrigerant, one or more springs installed to elastically support the movable member in a motion direction, a first stator applied with a current to produce a magnetic field, a second stator spaced apart from the first stator at a certain interval, a conductor member electromagnetically induced by the magnetic field produced by the first stator and the second stator to make the movable member linearly reciprocate, and a control unit which controls supply of the current with respect to the first stator.

17 Claims, 11 Drawing Sheets

(56) References Cited

U.S. PATENT DOCUMENTS

| | | | |
|---|---|---|---|
| 7,816,873 B2* | 10/2010 | Choi et al. | 318/119 |
| 7,859,801 B2* | 12/2010 | Roh et al. | 361/22 |
| 2003/0026703 A1* | 2/2003 | Yoo et al. | 417/44.11 |
| 2004/0245862 A1* | 12/2004 | Hong et al. | 310/12 |
| 2005/0031470 A1* | 2/2005 | Lee | 417/416 |
| 2005/0158193 A1* | 7/2005 | Roke et al. | 417/417 |
| 2008/0131292 A1* | 6/2008 | Hong et al. | 417/44.1 |
| 2009/0047154 A1* | 2/2009 | Choi et al. | 417/417 |
| 2009/0206778 A1* | 8/2009 | Roh et al. | 318/127 |

FOREIGN PATENT DOCUMENTS

| | | |
|---|---|---|
| WO | WO 88/01036 A1 | 2/1988 |
| WO | WO 2006025619 A2 * | 3/2006 |
| WO | WO-2006025619 A2 * | 9/2006 |

* cited by examiner

-Prior Art-

-Prior Art- $I_M$: The first winding Current
$I_A$: The second winding Current
$B_S$: Stator Magnetic field

LINEAR COMPRESSOR

This application is a 35 U.S.C. §371 National Stage entry of International Application No. PCT/KR2008/004347, filed on Aug. 4, 2009, which claims the benefit of the earlier filing date and right of priority to Korean Application No. 10-2008-0077168, filed Aug. 6, 2008, the content of which are hereby incorporated by reference herein in their entirety.

TECHNICAL FIELD

The present invention relates to a linear compressor, and more particularly to, a linear compressor which employs a conductor member in a linear motor instead of a magnet to produce a driving force by magnetic induction and automatically or naturally modulate a cooling capacity according to a load.

BACKGROUND ART

In general, a compressor is a mechanical apparatus receiving power from a power generation apparatus such as an electric motor, a turbine or the like, and compressing the air, refrigerant or various operation gases to raise a pressure. The compressor has been widely used for electric home appliances such as refrigerators and air conditioners, and application thereof has been expanded to the whole industry.

The compressors are roughly classified into a reciprocating compressor, wherein a compression space to/from which an operation gas is sucked and discharged is defined between a piston and a cylinder, and the piston linearly reciprocates in the cylinder to compress refrigerant, a rotary compressor, wherein a compression space to/from which an operation gas is sucked and discharged is defined between an eccentrically-rotating roller and a cylinder, and the roller eccentrically rotates along an inside wall of the cylinder to compress refrigerant, and a scroll compressor, wherein a compression space to/from which an operation gas is sucked and discharged is defined between an orbiting scroll and a fixed scroll, and the orbiting scroll rotates along the fixed scroll to compress refrigerant.

Recently, among the reciprocating compressors, a linear compressor has been actively developed because it improves compression efficiency and provides simple construction by removing a mechanical loss caused by motion conversion by directly connecting a piston to a linearly-reciprocating driving motor.

FIG. 1 is a side view illustrating a conventional linear compressor. The conventional linear compressor is installed such that a structure composed of a frame 2, a cylinder 3, a piston 4, a suction valve 6, a discharge valve 7, a linear motor 10, a motor cover 18, a supporter 19, a rear cover 20, main springs S1 and S2 and a suction muffler assembly 21 is elastically supported inside a shell 1.

The cylinder 3 is fixedly fitted into the frame 2, the discharge valve 7 is installed to block one end of the cylinder 3, the piston 4 is inserted into the cylinder 3, and the thin suction valve 6 is installed to open and close a suction hole 5 of the piston 4.

The linear motor 10 is installed such that a gap is maintained between an inner stator 12 and an outer stator 14 and a magnet frame 16 can linearly reciprocate therein. The magnet frame 16 is connected to the piston 4 by a piston fixing portion 16c, and linearly reciprocates due to a mutual electromagnetic force between the inner stator 12 and the outer stator 14 and the magnet frame 16 to operate the piston 4.

The motor cover 18 supports the outer stator 14 in an axial direction and is bolt-fixed to the frame 2 so as to fix the outer stator 14, and the rear cover 20 is coupled to the motor cover 18. The supporter 19 connected to the other end of the piston 4 is installed between the motor cover 18 and the rear cover 20 to be elastically supported by the main springs S1 and S2 in an axial direction, and the suction muffler assembly 21 which allows suction of refrigerant is also fastened with the supporter 19.

Here, the main springs S1 and S2 include four front springs S1 and four rear springs S2 in up-down and left-right symmetric positions around the supporter 19. When the linear motor 10 operates, the front springs S1 and the rear springs S2 move in opposite directions to buffer the shock of the piston 4 and the supporter 19. Moreover, refrigerant existing on the side of a compression space P serves as a kind of gas spring to buffer the shock of the piston 4 and the supporter 19.

Accordingly, when the linear motor 10 operates, the piston 4 and the suction muffler assembly 21 connected thereto linearly reciprocate, and the operations of the suction valve 6 and the discharge valve 7 are automatically controlled with variations of a pressure of the compression space P, so that the refrigerant is sucked into the compression space P via a suction tube (not shown), the suction muffler assembly 21 and the suction hole 5 of the piston 4, compressed therein, and discharged to the outside through a discharge cap 8, a loop pipe 9 and a discharge tube (not shown) on the shell side.

The linear motor 10 of the linear compressor includes the inner stator 12, the outer stator 14, and the magnet frame 16 around the frame 2 as shown in FIG. 1. The inner stator 12 is constructed such that laminations are stacked in a circumferential direction, and the outer stator 14 is constructed such that core blocks 14b are installed on a coil winding body 14a at certain intervals in a circumferential direction.

FIG. 2 is a perspective view illustrating a conventional magnet frame. The magnet frame 16 includes a cylindrical frame main body 16a positioned between the inner stator 12 and the outer stator 14 of the linear motor 10, magnets 16b fixed to some outer portions of the frame main body 16a, and a piston fixing portion 16c extended to the inside so that the piston 4 can be fixed to one end of the frame main body 16a. Holes 16d are formed on one side of the magnets 16b.

Here, the magnets 16b are formed on the frame main body 16a at certain intervals in a circumferential direction. Preferably, eight magnets 16b are coupled to the outside of the frame main body 16a at regular intervals.

In the conventional linear compressor, the magnet linearly reciprocates between the inner stator and the outer stator due to a mutual electromagnetic force. However, it is difficult to employ a cylindrical magnet because of a high price of the magnet. Even if several bar-shaped magnets are fixed to form a magnet frame, the unit costs and overall costs of production still increase.

Moreover, in the conventional linear compressor, the linear motor varies a stroke to modulate a cooling capacity according to a load. To this end, a complicated control unit is provided, which is accompanied with design limitations on sizes of peripheral components. Further, a complicated control method is required, which increases the costs of production and complicates a manufacturing process. Furthermore, much power is consumed for controlling, which degrades efficiency of the whole compressor.

DISCLOSURE

Technical Problem

The present invention is conceived to solve the foregoing problems in the prior art, and an object of the present invention is to provide a linear compressor wherein a conductor member is used instead of a magnet to simplify the shape and controlling of a linear motor.

Another object of the present invention is to provide a linear compressor wherein a linear motor is not affected by variations of externally-applied power, the linear compressor automatically modulating a cooling capacity according to a load without adopting a special control method.

A further object of the present invention is to provide a linear compressor wherein the construction of a linear motor supplying a driving force to the linear compressor is simplified to improve productivity.

Technical Solution

According to an aspect of the present invention, there is provided a linear compressor, including: a fixed member provided with a compression space; a movable member which linearly reciprocates inside the fixed member to compress refrigerant; one or more springs installed to elastically support the movable member in a motion direction; a first stator applied with a current to produce a magnetic field; a second stator spaced apart from the first stator at a certain interval; a conductor member electromagnetically induced by the magnetic field produced by the first stator and the second stator to make the movable member linearly reciprocate; and a control unit which controls supply of the current with respect to the first stator.

In addition, preferably, the linear compressor further includes a connection member which connects the movable member to the conductor member, wherein the conductor member is a conductor mounted on one end of the connection member.

Moreover, preferably, the linear compressor further includes a connection member which connects the movable member to the conductor member, wherein the conductor member is formed by alternately stacking an annular iron piece and conductor, and mounted on one end of the connection member.

Further, preferably, the linear compressor further includes a connection member which connects the movable member to the conductor member, wherein the conductor member is a conductor line wound around one end of the connection member.

Furthermore, preferably, the first stator includes a coil winding body wound with a coil, and a core mounted on the coil winding body, and the control unit controls On and Off of current supply with respect to the coil winding body so as to produce a one-way magnetic field in the conductor member.

Still furthermore, preferably, the springs include one or more of a first spring installed to elastically support the movable member in a refrigerant compression direction, and a second spring installed to elastically support the movable member in the opposite direction to the refrigerant compression direction.

Still furthermore, preferably, at least some portion of the conductor member is positioned between the first stator and the second stator.

Still furthermore, preferably, the first stator includes first and second coil winding bodies spaced apart at an interval in an axial direction and wound with a coil, respectively, and a core mounted on the first and second coil winding bodies, and the control unit performs a control to supply currents having a phase difference to the first and second coil winding bodies to produce a two-way magnetic field in the conductor member.

Still furthermore, preferably, the coil is wound around the first and second coil winding bodies in the same direction, and a capacitor is connected in series to one of the first and second coil winding bodies.

Still furthermore, preferably, the control unit supplies currents having a phase difference of 90° to the first and second coil winding bodies.

Still furthermore, preferably, the springs are a first spring installed to elastically support the movable member in a refrigerant compression direction, and a second spring installed to elastically support the movable member in the opposite direction to the refrigerant compression direction.

Still furthermore, preferably, when the movable member operates over a certain speed, a speed of the movable member and a force moving the movable member are inversely proportional at different ratios according to an amplitude of a load.

Still furthermore, preferably, when the load increases, the speed of the movable member increases, and the force moving the movable member increases.

Still furthermore, preferably, the control unit controls supply of the current to automatically vary a stroke according to the load.

Still furthermore, preferably, when the load increases, an electrical resonance frequency becomes approximate to a mechanical resonance frequency.

According to another aspect of the present invention, there is provided a linear compressor, including: a fixed member provided with a compression space; a movable member which is provided with a conductor member, and linearly reciprocates inside the fixed member to compress refrigerant; a plurality of springs installed to elastically support the movable member in a motion direction; a first stator applied with a current to magnetically induce the conductor member; a second stator positioned corresponding to the first stator so that at least some portion of the conductor member can be positioned in a space between the first stator and the second stator; and a control unit which controls supply and interception of power with respect to the first stator, wherein, when a load increases, an electrical resonance frequency becomes approximate to a mechanical resonance frequency, so that the linear compressor performs a natural cooling capacity modulation control.

Advantageous Effects

According to the present invention, since the linear motor employs the conductor member instead of the magnet to supply a driving force by magnetic induction, the mechanism and controlling thereof are simplified, so that the costs of production are cut down. Moreover, since the linear motor can be driven by minimum elements without a special driving unit for controlling, it is possible to improve entire efficiency.

In addition, according to the present invention, the linear motor is not affected by variations of externally-applied power, and varies a stroke to automatically modulate a cooling capacity according to a load without adopting a special control method. It is thus possible to maximize cooling efficiency.

Moreover, according to the present invention, the construction of the linear motor supplying a driving force to the linear compressor is simplified to improve productivity.

MODE FOR INVENTION

Hereinafter, the present invention will be described in detail with reference to embodiments and drawings.

Figure 1:
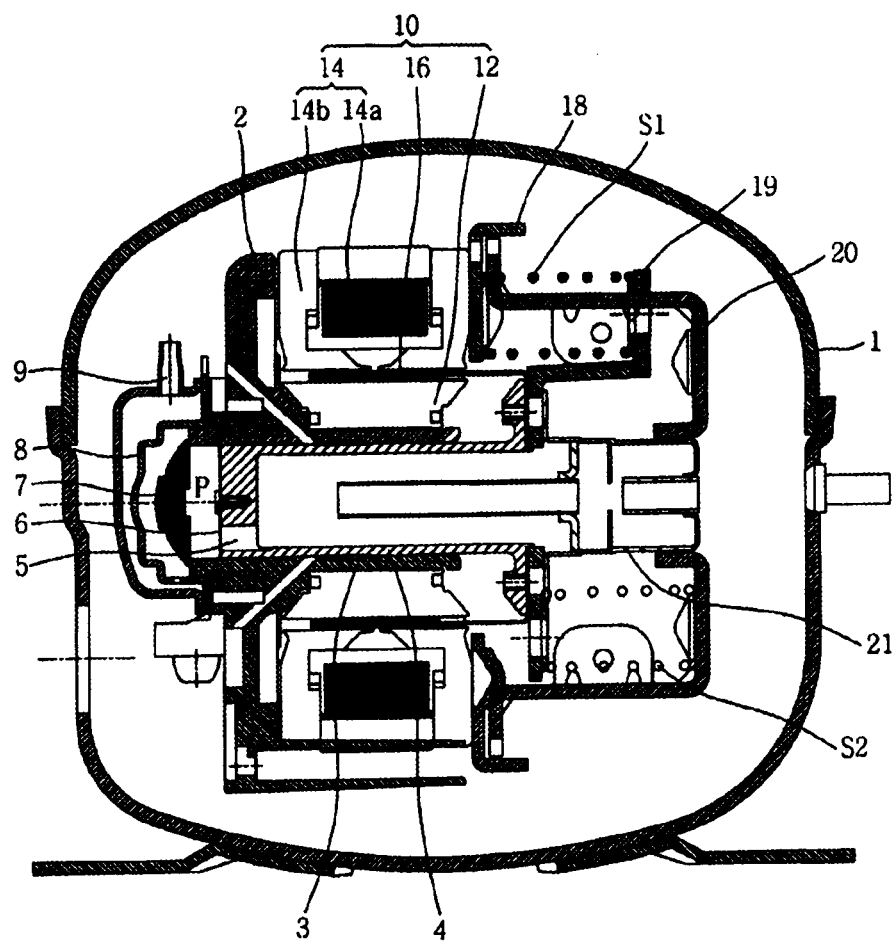
FIG. 1 is a side view illustrating a conventional linear compressor.
Figure 2:
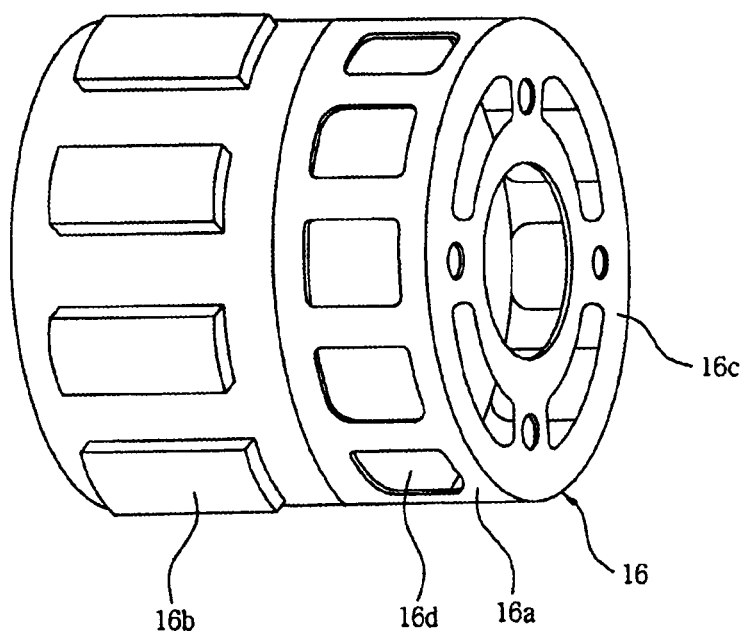
FIG. 2 is a perspective view illustrating a conventional magnet frame.
Figure 3:
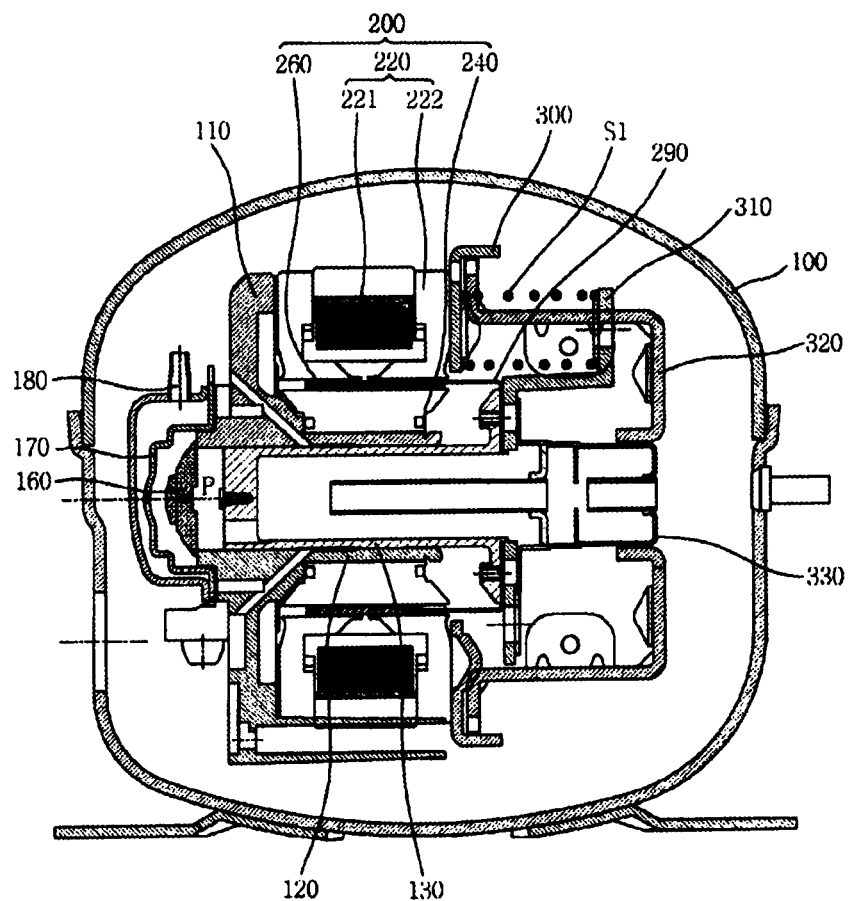
FIG. 3 is a side-sectional view illustrating a first embodiment of a linear compressor according to the present invention.
Figure 4:
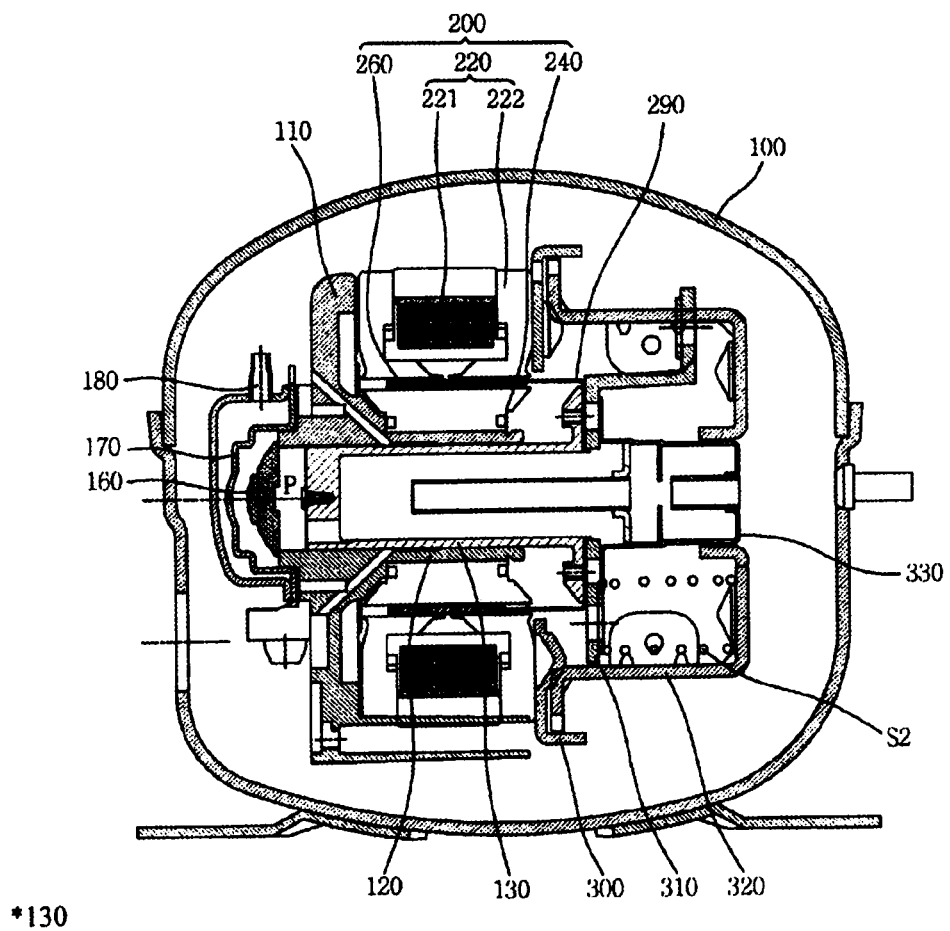
FIG. 4 is a side-sectional view illustrating a second embodiment of the linear compressor according to the present invention.
Figure 5:
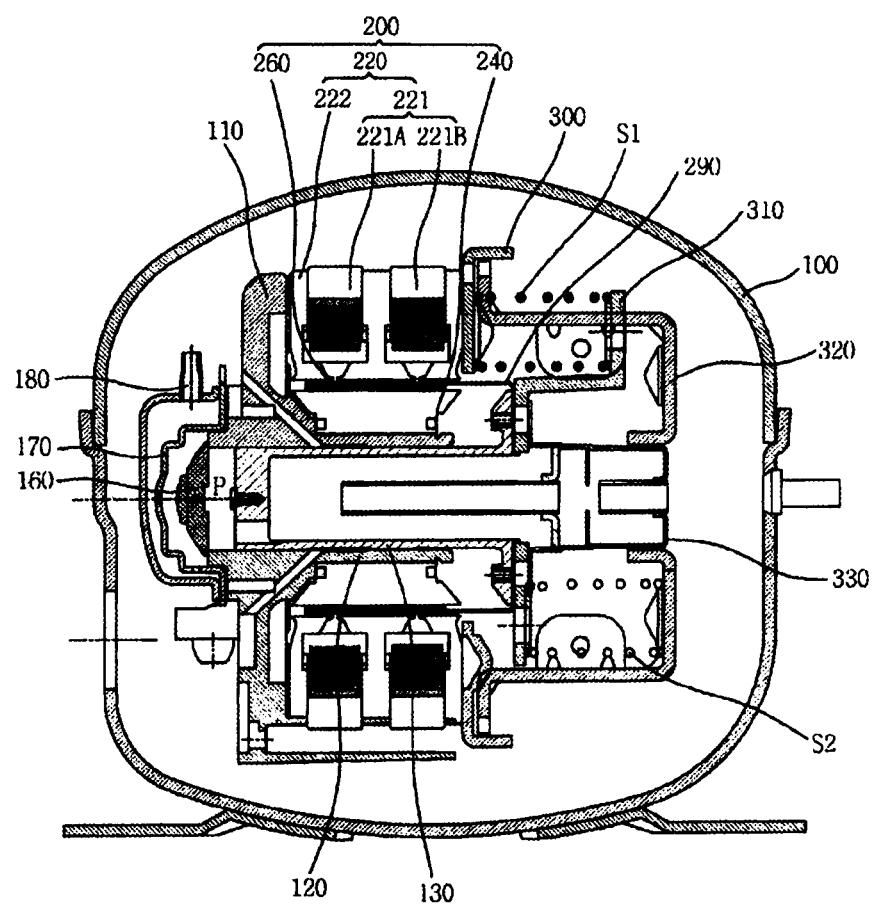
FIG. 5 is a side-sectional view illustrating a third embodiment of the linear compressor according to the present invention.

FIGS. 3 to 5 are side-sectional views illustrating various embodiments of a linear compressor according to the present invention.

As illustrated in FIGS. 3 to 5, the linear compressor according to the present invention is constructed such that a fixed member 120 provided with a compression space P of refrigerant, a movable member 130 compressing refrigerant in the fixed member 120, and a linear motor 200 driving the movable member 130 are installed in a hermetic container 100. The linear motor 200 includes first and second stators 220 and 240, and a conductor member 260 positioned in a space between the first and second stators 220 and 240.

The second stator 240 is fixed to an outer circumference of the fixed member 120, and the first stator 220 is fixed in an axial direction by a frame 110 and a motor cover 300. Since the frame 110 and the motor cover 300 are fastened and coupled to each other by a fastening member such as a bolt, the first stator 220 is fixed between the frame 110 and the motor cover 300. The frame 110 may be formed integrally with the fixed member 120, or manufactured individually from the fixed member 120 and coupled to the fixed member 120. A supporter 310 is connected to the rear of the movable member 130, and a rear cover 320 is coupled to the rear of the motor cover 300. The supporter 310 is positioned between the motor cover 300 and the rear cover 320. Springs S1 and S2 are installed in an axial direction to buffer the shock of the linear reciprocation of the movable member 130 with both ends supported by the supporter 310 and the motor cover 300 or the supporter 310 and the rear cover 320. Here, detailed installation positions and elastic moduli of the springs S1 and S2 may be changed according to the construction and operation of the linear motor 200, which will be described below in detail.

In addition, a suction muffler 330 is provided at the rear of the movable member 130. The refrigerant is introduced into the movable member 130 through the suction muffler 330, thereby reducing refrigerant suction noise.

Some portion of a front end of the movable member 130 has a hollow so that the refrigerant introduced through the suction muffler 330 can be introduced into and compressed in the compression space P defined between the fixed member 120 and the movable member 130. A suction valve (not shown) is installed at the front end of the movable member 130. The suction valve (not shown) opens the front end of the movable member 130 so that the refrigerant can flow from the movable member 130 to the compression space P, and closes the front end of the movable member 130 so that the refrigerant cannot flow back from the compression space P to the movable member 130.

When the refrigerant is compressed over a defined pressure in the compression space P by the movable member 130, a discharge valve 160 positioned at a front end of the fixed member 120 is open. The high-pressure compressed refrigerant is discharged to a discharge cap 170, discharged again to the outside of the linear compressor through a loop pipe 180, and circulated in a freezing cycle.

The linear motor 200 includes the first stator 220 through which a current flows, the second stator 240 maintaining a gap from the first stator 220, and the conductor member 260 installed maintaining a gap between the first and second stators 220 and 240, and magnetically induced by the first stator 220 to make the movable member 130 linearly reciprocate. The linear motor 200 includes a control unit (not shown) which controls supply of a current with respect to the first stator 220. Here, the first stator 220 is an outer stator relatively distant from the fixed member 120, and the second stator 240 is an inner stator mounted on the fixed member 120.

The linear motor 200 of the linear compressor so constructed is a linear motor 200 provided with two stators 220 and 240, but a general linear motor 200 provided with only one current-flowing stator 220 also belongs to the scope of the present invention. In addition, the linear compressor may include a power unit (not shown) which can receive power from the outside. As the power unit is an element obvious to a person of ordinary skill in the art, explanations thereof are omitted.

As illustrated in FIG. 3, an embodiment of the first stator 220 is constructed such that core blocks 222 are mounted on one coil winding body 221 wound with a coil in a circumferential direction. The control unit controls On/Off of current supply with respect to the coil winding body 221 so as to produce a one-way magnetic field in the conductor member 260, and produces a force so that the conductor member 260 can move in a refrigerant compression direction, i.e., a top dead center direction. Here, preferably, only the front main springs S1 are installed between the motor cover 300 and the supporter 310 to grant a restoration force against a force applied to the movable member 130 by the linear motor 200. In addition, preferably, the elastic modulus and number of the front main springs S1 are determined to be proportional to the coil winding number of the coil winding body 221. Accordingly, when the current is input to the coil winding body 221, a magnet flux forms a closed circuit along the first and second stators 220 and 240 due to the current flowing through the coil winding body 221. Since an induction field is produced in the conductor member 260 due to the magnetic flux, the force is applied in a top dead center direction, so that the conductor member 260 and the movable member 130 move in the top dead center direction to compress the refrigerant. Next, when the current is not input to the coil winding body 221, the magnet flux and the induction field are vanished, and the conductor member 260 and the movable member 130 move in a bottom dead center direction due to the restoration force of the front main springs S1. Such a process is repeated to suck, compress and discharge the refrigerant.

As illustrated in FIG. 4, another embodiment of the first stator 220 is constructed such that core blocks 222 are mounted on one coil winding body 221 wound with a coil in a circumferential direction like the above embodiment. The control unit controls On/Off of current supply with respect to the coil winding body 221 so as to produce a one-way magnetic field in the conductor member 260, and produces a force so that the conductor member 260 can move in a refrigerant suction direction, i.e., a bottom dead center direction unlike the above embodiment. Here, preferably, only the rear main springs S2 are installed between the supporter 310 and the rear cover 320 to grant a restoration force against a force applied to the movable member 130 by the linear motor 200. Moreover, preferably, the elastic modulus and number of the rear main springs S2 are determined to be proportional to the coil winding number of the coil winding body 221 as in the above embodiment. Therefore, when the current is input to the coil winding body 221, a magnet flux forms a closed circuit along the first and second stators 220 and 240 due to the current flowing through the coil winding body 221. Since an induction field is produced in the conductor member 260 due to the magnetic flux, the force is applied in a bottom dead center direction, so that the conductor member 260 and the movable member 130 move in the bottom dead center direction to suck the refrigerant. Next, when the current is not input to the coil winding body 221, the magnet flux and the induction field are vanished, and the conductor member 260 and the movable member 130 move in a top dead center direction due to the restoration force of the rear main springs S2. Such a process is repeated to suck, compress and discharge the refrigerant.

As illustrated in FIG. 5, a further embodiment of the first stator 220 is constructed such that first and second coil winding bodies 221A and 221B wound with a coil in a circumferential direction are positioned at a certain interval in an axial direction, and core blocks 222 are mounted on the first and second coil winding bodies 221A and 221B. The coil is wound around the first and second coil winding bodies 221A and 221B in the same direction. The control unit performs a control to supply currents having a phase difference of 90° to the first and second coil winding bodies 221A and 221B, respectively, to produce a two-way magnetic field in the conductor member 260, and repeats a process of producing a force so that the conductor member 260 can move in a refrigerant compression direction, i.e., a top dead center direction, and producing a force so that the conductor member 260 can move in a refrigerant suction direction, i.e., a bottom dead center direction.

Here, preferably, the front main springs S1 are installed between the motor cover 300 and the supporter 310 and the rear main springs S2 are installed between the supporter 310 and the rear cover 320 to grant a restoration force against a force applied to the movable member 130 by the linear motor 200. In addition, preferably, the elastic modulus and number of the front main springs S1 and the rear main springs S2 are determined to be proportional to the coil winding number of the first and second coil winding bodies 221A and 221B.

Accordingly, when the current is input to the first coil winding body 221A, as the currents having AC waveforms with a phase difference of 90° are input to the first and second coil winding bodies 221A and 221B, the magnetic flux also has AC waveforms. Since an induction field is produced in the conductor member 260 due to the magnetic flux, the force is applied alternately in top and bottom dead center directions, so that the conductor member 260 and the movable member 130 repeat a process of moving in the top dead center direction to compress the refrigerant and moving in the bottom dead center direction to suck the refrigerant.

The construction and operation of the conductor member 260 applied to the linear compressor so constructed will be described below in more detail.

Figure 6:
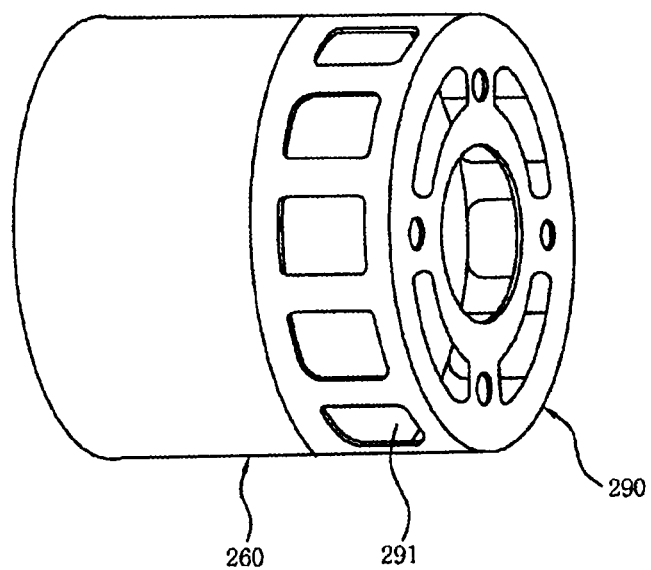
FIG. 6 is a perspective view illustrating a first embodiment of a conductor member applied to the linear compressor according to the present invention.
Figure 7:
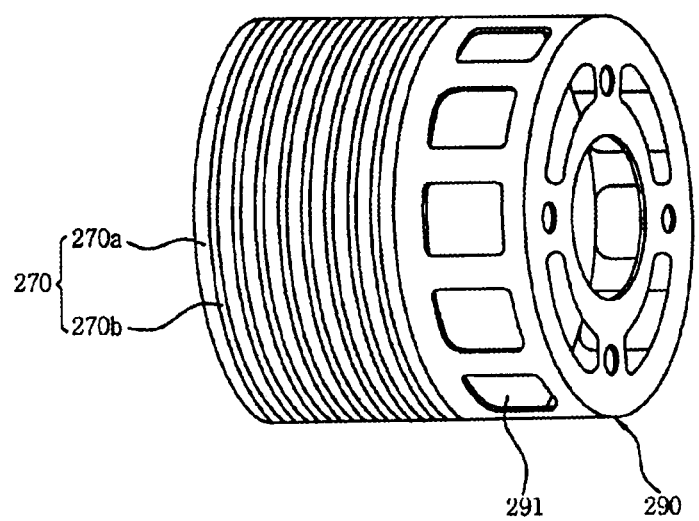
FIG. 7 is a perspective view illustrating a second embodiment of the conductor member applied to the linear compressor according to the present invention.
Figure 8:
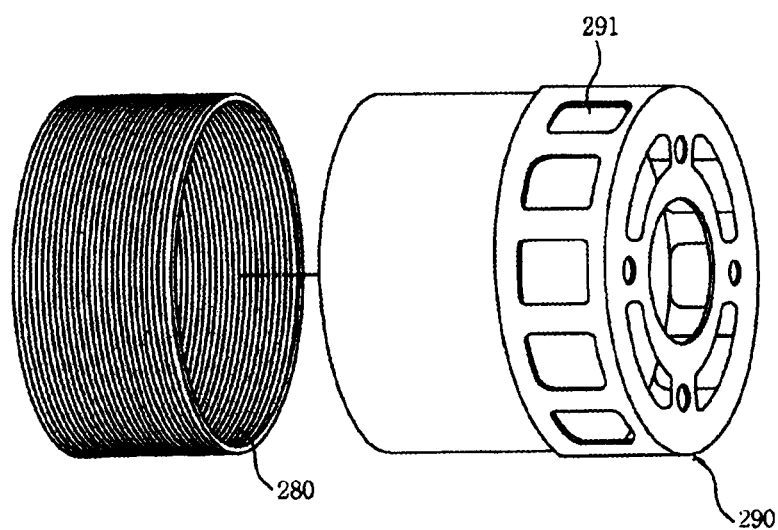
FIG. 8 is a perspective view illustrating a third embodiment of the conductor member applied to the linear compressor according to the present invention.

FIGS. 6 to 8 are perspective views illustrating various embodiments of the conductor member applied to the linear compressor according to the present invention.

As illustrated in FIG. 6, an embodiment of the conductor member 260 is formed of a conductor material such as Cu and Al in a shape corresponding to a connection member 290, e.g., a cylindrical shape. Here, the conductor member 260 is mounted on one end of the connection member 290 by an adhesive or an adhesion member, and the connection member 290 is installed to connect the conductor member 260 to the movable member 130. Surely, the connection member 290 has the same construction as the conventional one, and has various holes 291 in portions other than the mounting portion of the conductor member 260 to reduce a passage resistance or radiate heat.

As illustrated in FIG. 7, another embodiment of the conductor member 270 is formed in a cylindrical shape by alternately stacking an annular iron piece 270a and a ring conductor 270b. Like the above embodiment, the conductor member 270 is mounted on one end of a connection member 290 by an adhesive or an adhesion member, and the connection member 290 is installed to connect the conductor member 270 to the movable member 130. The ring conductor 270b may be formed of a conductor material such as Cu and Al.

As illustrated in FIG. 8. a further embodiment of the conductor member 280 is formed by winding a conductor line. The conductor member 280 is mounted to be wound around the outside of one end of a connection member 290 or the outside of the connection member 290, and the connection member 290 is installed to connect the conductor member 280 to the movable member 130.

The conductor members 260, 270 and 280 shown in FIGS. 6 to 8 are preferably formed of Al or Cu, and have the feature of being magnetically induced by an electromagnetic force. Since the conductor members 260, 270 and 280 are applied to the linear motor 200, the present invention can more reduce manufacturing expenses than the prior art using the magnet.

Figure 9:
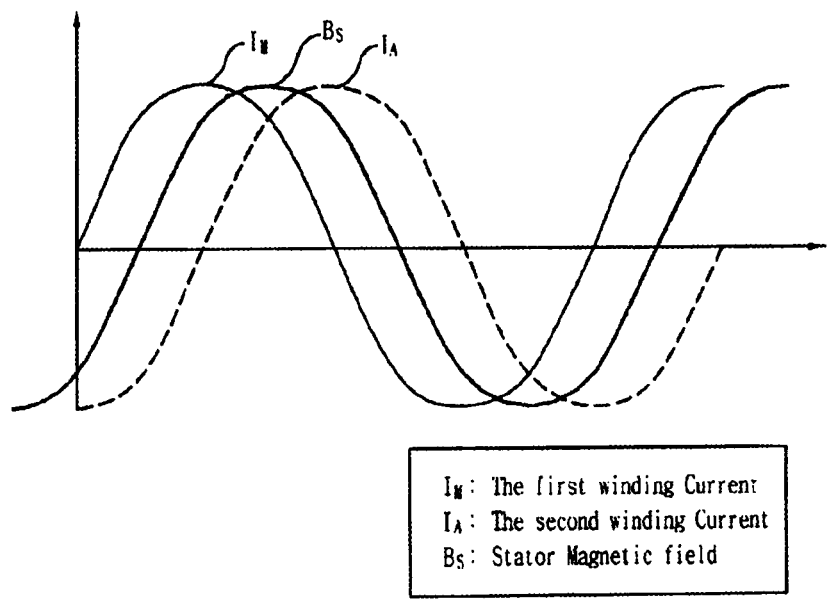
FIG. 9 is a graph showing magnetic flux waveforms of a linear motor shown in FIG. 5 by an applied current.

FIG. 9 is a graph showing magnetic flux waveforms of the linear motor shown in FIG. 5 by an applied current. When the control unit applies power to the linear motor 200 including the first and second coil winding bodies 221A and 221B, with respect to currents flowing through the first stator 220, a current $I_M$ of the first coil winding body 221A and a current $I_A$ of the second coil winding body 221B have AC waveforms with a phase difference of 90°. Therefore, a synthetic magnetic field $B_S$ of the first stator 220 by the current shows AC waveforms. The produced magnetic field linearly reciprocates, alternated in positive and negative directions like the waveforms of the currents $I_M$ and $I_A$.

Figure 10:
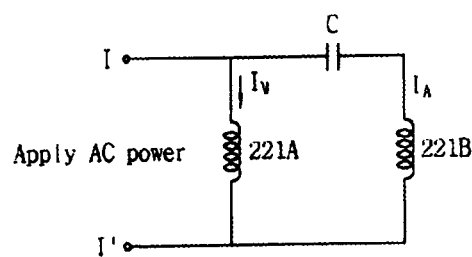
FIG. 10 is a schematic circuit view for applying a current to the linear motor shown in FIG. 5.

FIG. 10 is a schematic circuit view for applying a current to the linear motor shown in FIG. 5. For example, when an AC current is applied to a terminal I-I', the current $I_A$ applied to the second coil winding body 221A is the AC current applied through a capacitor C, and has a phase difference of 90° from the current $I_M$ applied to the first coil winding body 221A.

Figure 11:
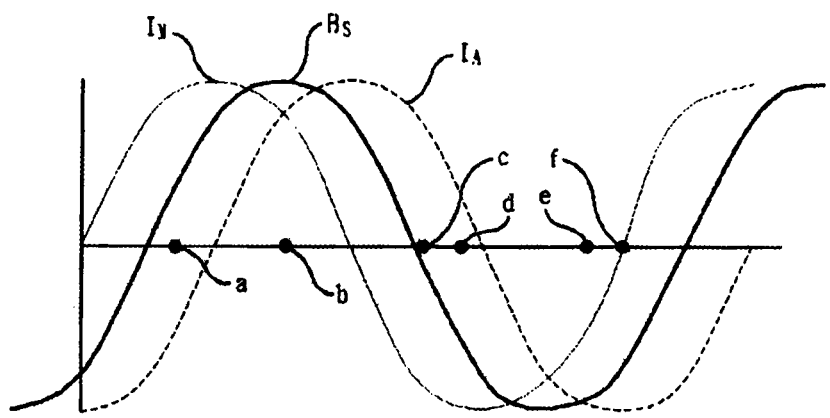
FIG. 11 is a graph showing linear reciprocation magnetic flux operations of the linear motor shown in FIG. 5.
Figure 11:
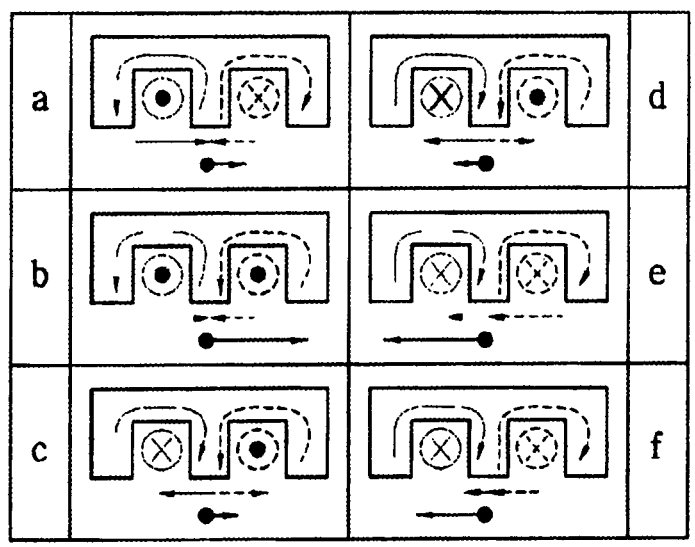

FIG. 11 is a graph showing linear reciprocation magnetic flux operations of the linear motor shown in FIG. 5. FIG. 11 provides a graph showing the current $I_M$ of the first coil winding body 221A, the current $I_A$ of the second coil winding body 221B, and the synthetic magnetic field $B_S$ of the first stator 220 in the application of the current, and a table showing the linear reciprocation magnetic flux operations of the linear motor 200 in points a to f existing in one period. That is, the table of FIG. 11 shows that the first and second coil winding bodies 221A and 221B are repeatedly magnetized into N-S and S-N poles in the points a to f according to the applied voltage.

More specifically, in the points a, b and c, $B_S$ which is the sum of $I_M$ and $I_A$ appears in a positive direction, i.e., an N pole, and an amplitude thereof increases and then decreases, and in the points d, e and f, $B_S$ which is the magnetic field sum of $I_M$ and $I_A$ appears in a negative direction, i.e., an S pole, and an amplitude thereof increases and then decreases. As noted above, the magnetic flux is alternated in the positive/negative directions by the first coil winding body 221A and the second coil winding body 221B, and the electromagnetic force of the first and second stators 220 and 240 and the induction field of the conductor member 260 interwork with each other.

Figure 12:
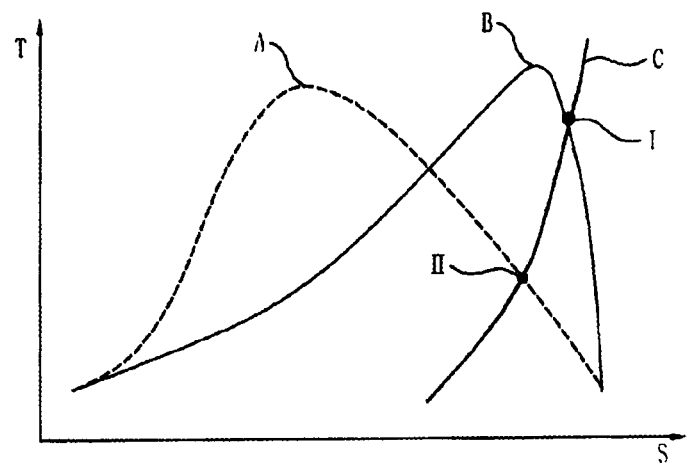
FIG. 12 is a graph showing the relation between a slip and a torque of the linear motor shown in FIG. 5.

FIG. 12 is a graph showing the relation between a slip and a torque of the linear motor applied to the present invention.

In general, preferably, the linear compressor is designed to operate in a resonance state so as to improve efficiency. When a load increases, a refrigerant gas in the linear compressor is expanded, so that an elastic modulus of a gas spring increases. A mechanical resonance frequency of the linear compressor also increases. In order to make the linear compressor operate in the resonance state, preferably, an LC resonance frequency (a resonance frequency by the first coil winding body 221A and/or the second coil winding body 221B and/or the capacitor C noted above) which is an electrical resonance frequency is varied to be equal to a mechanical resonance frequency varied according to the load. Therefore, the linear compressor employing the linear motor 200 adopting the conductor member 260 according to the present invention is designed so that the LC resonance frequency can be varied according to the load to follow the mechanical resonance frequency. That is, when the load increases, e.g. when an ambient temperature rises from a low to high temperature, since a speed of the movable member 130 in a high temperature state is slower than that in a low temperature state due to increase of the elastic modulus of the refrigerant gas, a cooling capacity decreases. To compensate for such decrease, the LC resonance frequency is made to be equal to the mechanical resonance frequency in the high temperature state, so that mechanical efficiency can be improved by resonance. Accordingly, while the LC resonance frequency is designed to be approximate to the mechanical resonance frequency in the high temperature state, it is designed to become automatically larger than the mechanical resonance frequency in the low temperature state. Here, preferably, in the high temperature state, the linear compressor operates in a state approximate to the resonance state rather than in the resonance state so as to reduce noise. Therefore, when the linear compressor wherein the LC resonance frequency is designed to be equal or almost equal to the mechanical resonance frequency in a high load is applied to e.g., a refrigerator, the linear motor 200 automatically regulates a freezing capacity, and the refrigerator naturally modulates the cooling capacity according to the load.

When the linear motor 200 adopting the conductor member 260 operates, the relation between the slip which is a speed of the movable member 130 and the torque which is a force moving the movable member 130 will be examined in more detail. As illustrated in FIG. 12, when the linear motor 200 is initially driven, the slip and the torque rise to be proportional. When the linear motor 200 stably operates in a slip of over a certain value or a set value, the slip and the torque are inversely proportional regardless of a load. Here, an S-T curve becomes different according to the load. A represents an S-T curve in a low temperature state, B represents an S-T curve in a high temperature state, and C represents an S-T curve produced considering variations of the mechanical resonance frequency.

That is, when the linear motor 200 operates in a state moving from a low temperature region II to a high temperature region I, the speed of the movable member 130 exists near a synchronous speed and falls. Although the speed of the movable member 130 falls, since the LC resonance frequency is approximate to the mechanical resonance frequency to ensure the operation in the resonance state, mechanical efficiency is maximized, so that the speed of the movable member 130 and the force moving the movable member 130 increase to thereby raise the stroke and modulate the cooling capacity according to the load. Surely, since the LC resonance frequency is designed to be equal or approximate to the mechanical resonance frequency in the high load, the movable member 130 operates to reach a top dead center, and stably performs compression. As the operation is performed in the resonance state, efficiency of the compressor is maximized.

On the contrary, when the linear motor 200 operates in a state moving from the high temperature region I to the low temperature region II, the speed of the movable member 130 exists near the synchronous speed. Although the speed of the movable member 130 rises, since the LC resonance frequency becomes much larger than the mechanical resonance frequency to be distant from the resonance state, mechanical efficiency is degraded, so that the speed of the movable member 130 and the force moving the movable member 130 decrease to thereby drop the stroke and modulate the cooling capacity according to the load. The linear compressor mechanically designed using the mechanical resonance frequency varied according to the load adopts the current direct application method, and does not require special controlling for modulating the cooling capacity according to the load. As a result, the linear compressor does not require a special control apparatus and control method, which simplifies the controlling. The linear compressor of this embodiment does not forcibly or artificially vary the amplitude or frequency of power applied to the linear motor to modulate the cooling capacity, but naturally or automatically modulates the cooling capacity. Surely, while naturally modulating the cooling capacity, the linear compressor can forcibly modulate the cooling capacity.

The current direct application method, which is the mechanical design method using the mechanical resonance frequency varied according to the load, is nothing but an example of the control methods for naturally modulating the cooling capacity according to the load. Besides, a direct application method which is a mechanical design method optimizing the relation between a slip and a torque regardless of a load, an AC chopper method and a triac phase control method which are methods using applied voltage variations, and an inverter method which is a method using applied frequency variations can also be used.

While the present invention has been described in connection with the preferred embodiments, the present invention is not limited thereto and is defined by the appended claims. Therefore, it will be understood by those skilled in the art that various modifications and changes can be made thereto without departing from the spirit and scope of the invention defined by the appended claims.

The invention claimed is:

1. A linear compressor, comprising:
   a fixed member provided with a compression space;
   a movable member which linearly reciprocates inside the fixed member to compress refrigerant;
   one or more springs installed to elastically support the movable member in a motion direction;
   a first stator applied with a current to produce a magnetic field;
   a second stator spaced apart from the first stator at a certain interval;
   a conductor member electromagnetically induced by the magnetic field produced by the first stator and the second stator to make the movable member linearly reciprocate; and
   a control unit which controls supply of the current with respect to the first stator,
   wherein, when the movable member operates over a certain speed, a speed of the movable member and a force moving the movable member are inversely proportional at different ratios according to an amplitude of a load.

2. The linear compressor of claim 1, further comprising a connection member which connects the movable member to the conductor member,
   wherein the conductor member is a conductor mounted on one end of the connection member.

3. The linear compressor of claim 1, further comprising a connection member which connects the movable member to the conductor member,
   wherein the conductor member is formed by alternately stacking an annular iron piece and a conductor, and mounted on one end of the connection member.

4. The linear compressor of claim 1, further comprising a connection member which connects the movable member to the conductor member,
   wherein the conductor member is a conductor line wound around one end of the connection member.

5. The linear compressor of claim 1, wherein the first stator comprises a coil winding body wound with a coil, and a core mounted on the coil winding body, and the control unit controls On and Off of a current supply with respect to the coil winding body so as to produce a one-way magnetic field in the conductor member.

6. The linear compressor of claim 5, wherein the springs comprise one or more of a first spring installed to elastically support the movable member in a refrigerant compression direction, and a second spring installed to elastically support the movable member in the opposite direction to the refrigerant compression direction.

7. The linear compressor of claim 1, wherein at least some portion of the conductor member is positioned between the first stator and the second stator.

8. The linear compressor of claim 7, wherein the first stator comprises first and second coil winding bodies spaced apart at an interval in an axial direction and wound with a coil, respectively, and a core mounted on the first and second coil winding bodies, and the control unit performs a control to supply currents having a phase difference to the first and second coil winding bodies to produce a two-way magnetic field in the conductor member.

9. The linear compressor of claim 8, wherein the coil is wound around the first and second coil winding bodies in the same direction, and a capacitor is connected in series to one of the first and second coil winding bodies.

10. The linear compressor of claim 8, wherein the control unit supplies currents having a phase difference of 90° to the first and second coil winding bodies.

11. The linear compressor of claim 8, wherein the springs are a first spring installed to elastically support the movable member in a refrigerant compression direction, and a second spring installed to elastically support the movable member in the opposite direction to the refrigerant compression direction.

12. The linear compressor of claim 1, wherein, the control unit varies the amplitude or frequency of power applied to the first stator.

13. The linear compressor of claim 1, wherein, if the movable member operates below a certain speed, when the load increases, the speed of the movable member increases, and the force moving the movable member increases.

14. The linear compressor of claim 13, wherein the control unit controls supply of the current to automatically vary a stroke according to the load.

15. The linear compressor of claim 1, wherein, when the load increases, an electrical resonance frequency becomes approximate to a mechanical resonance frequency.

16. A linear compressor, comprising:
    a fixed member provided with a compression space;
    a movable member which is provided with a conductor member, and linearly reciprocates inside the fixed member to compress refrigerant;
    a plurality of springs installed to elastically support the movable member in a motion direction;
    a first stator applied with a current to magnetically induce the conductor member;
    a second stator positioned corresponding to the first stator so that at least some portion of the conductor member can be positioned in a space between the first stator and the second stator; and
    a control unit which controls supply and interception of power with respect to the first stator, wherein, when a load increases, an electrical resonance frequency becomes approximate to a mechanical resonance frequency, so that the linear compressor performs an automatic cooling capacity modulation control,
    wherein, when the movable member operates over a certain speed, a speed of the movable member and a force moving the movable member are inversely proportional at different ratios according to the amplitude of the load.

17. The linear compressor of claim 16, wherein the control unit varies the amplitude or frequency of power applied to the first stator to selectively perform a forcible cooling capacity modulation control.

* * * * *